United States Patent [19]

Ritsema et al.

[11] 4,448,291

[45] May 15, 1984

[54] ROTOR FOR A DISC BRAKE ASSEMBLY

[75] Inventors: Irving R. Ritsema; Donald D. Johannesen, both of South Bend, Ind.

[73] Assignee: The Bendix Corporation, Southfield, Mich.

[21] Appl. No.: 332,786

[22] Filed: Dec. 21, 1981

[51] Int. Cl.³ .............................................. F16D 65/12
[52] U.S. Cl. .............................................. 188/218 XL
[58] Field of Search .......... 188/71.6, 218 XL, 264 A, 188/264 AA; 192/70.12, 113 A

[56] References Cited

U.S. PATENT DOCUMENTS

| 3,623,579 | 11/1971 | Hendrickson | 188/218 XL |
| 3,730,304 | 5/1973 | Buyze | 188/218 XL |
| 4,263,992 | 4/1981 | Moore et al. | 188/218 XL |

FOREIGN PATENT DOCUMENTS

| 1575826 | 7/1969 | Fed. Rep. of Germany. |
| 2064364 | 7/1972 | Fed. Rep. of Germany. |
| 1579316 | 8/1969 | France. |

Primary Examiner—Duane A. Reger
Attorney, Agent, or Firm—Larry J. Palguta; Paul D. Schoenle; Ken C. Decker

[57] ABSTRACT

A rotor for a disc brake assembly includes at least two members (40, 42) opposing a pair of friction elements (16, 18). The members are stamped to form projections (46) in abutment with each other to join the members together. The projections (46) also space the members from each other to form a clearance (58) and a connecting portion (44) cooperates with some of the projections (46) to prevent rotation between the connecting portion (44) and the two members (40, 42).

6 Claims, 6 Drawing Figures

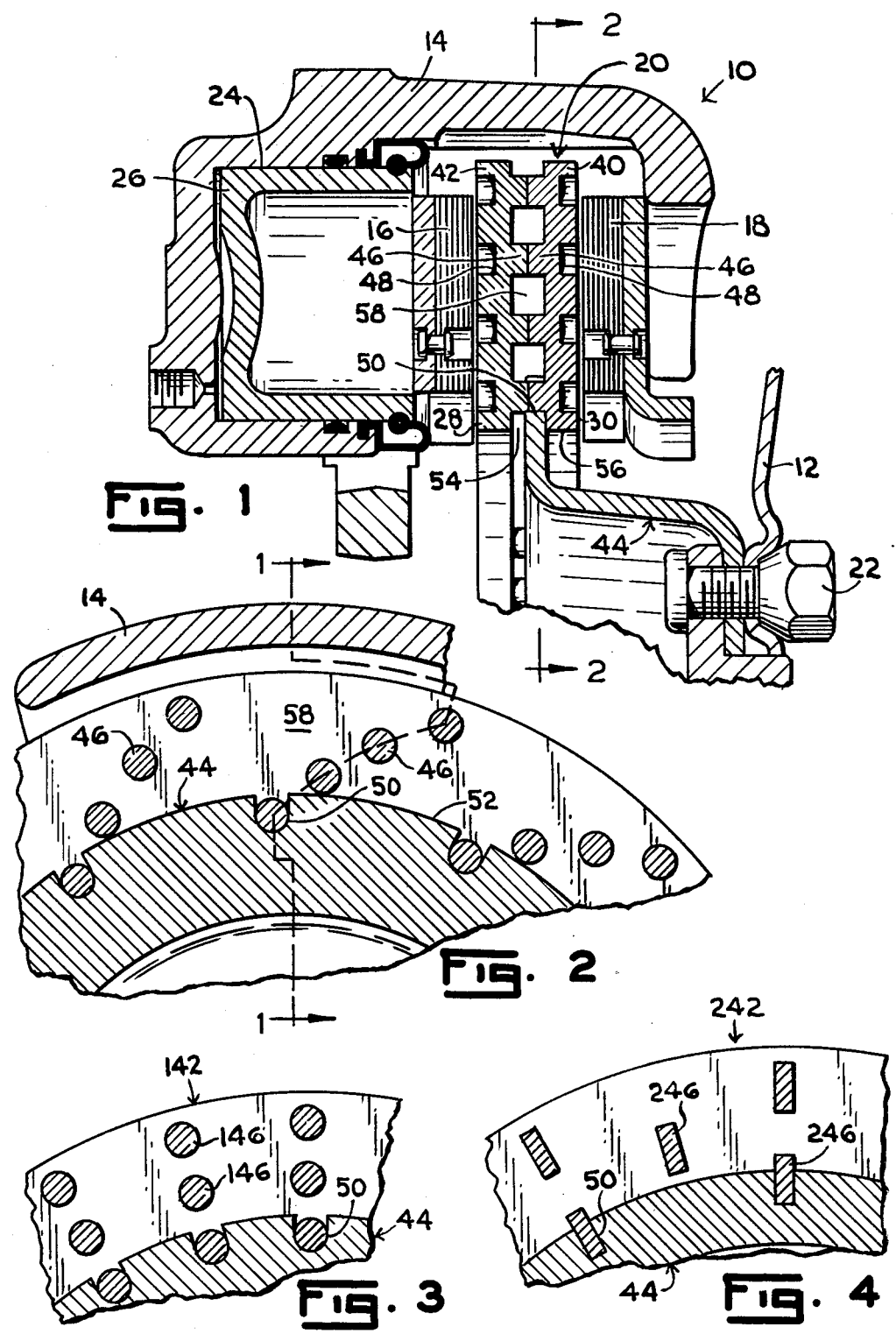

ROTOR FOR A DISC BRAKE ASSEMBLY

The present invention relates to a rotor for a disc brake assembly. The disc brake assembly includes a pair of friction elements engageable with the rotor and the rotor is connected with a wheel assembly, such that retarding rotation of the rotor also causes retarding rotation for the wheel assembly during braking.

A rotor for a disc brake assembly having a pair of friction elements engageable with the rotor to retard rotation thereof, the rotor comprising at least a pair of stamped members with radially extending surfaces engageable with the pair of friction elements, and the pair of stamped members cooperate to define a clearance therebetween permitting air flow through the rotor to readily convey thermal energy to an environment for the disc brake during braking.

In U.S. Pat. No. 3,941,221 (Pringle) issued Mar. 2, 1976, a stamped rotor is disclosed. The stamped rotor includes a pair of members which include radially extending surfaces that are engageable with a pair of friction elements, respectively. The pair of members are in abutment at radially inner and outer edges to provide a uniform spacing over the radial intermediate dimension therefore. Consequently, during braking the friction elements are biased into tight engagement with the pair of members so that in the absence of axial support the radial intermediate portion of the members will deflect to cause uneven lining wear for the pair of friction elements. Furthermore, the temperature fluctuations experienced by the pair of members could result in permanent distortion so that the member surfaces provide a concave surface engageable with its associated friction element rather than a parallel surface. With the concave surface, only the radial inner and outer edges of the member will tightly engage its associated friction element, thereby reducing the effective braking surface area for the rotor.

The present invention is characterized in that each of said pair of stamped members include a plurality of integrally formed projections extending axially toward opposite stamped members, said projections being fastened together to secure said pair of stamped members together, said projections cooperating to define said clearance and said projections cooperating to substantially reduce axial deflection of said pair of stamped members into said clearance during braking over the entire radial dimension for said pair of stamped members.

It is an advantage of the present invention that a light-weight stamped rotor is provided with integral support projections to substantially prevent deflection of the rotor in an axial direction.

The invention will now be described with reference to the accompanying drawings wherein:

FIG. 1 is a side view of a disc brake assembly including a rotor constructed in accordance with the present invention;

FIG. 2 is a view taken along line 2—2 of FIG. 1;

FIG. 3 is a view similar to FIG. 2 showing a first alternative rotor construction;

FIG. 4 is a view similar to FIG. 2 showing a second alternative rotor construction.

Figure 5:
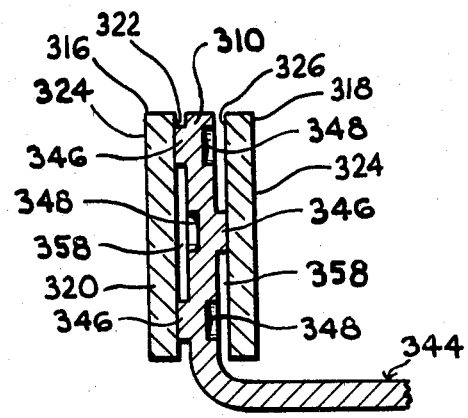
FIG. 5 is a view similar to FIG. 1 showing a third alternative rotor construction.
Figure 6:
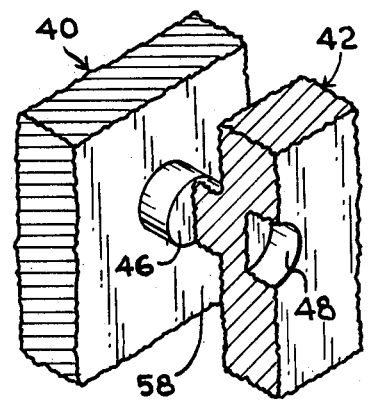
FIG. 6 is a cut away of the integral support projections.

The disc brake assembly of FIG. 1 is generally identified as reference numeral 10. The disc brake assembly 10 is provided on a vehicle (not shown) in order to control braking for a wheel assembly 12. A caliper 14 cooperates with a pair of friction elements 16 and 18 in a conventional manner to retard rotation of the wheel assembly 12 via a rotor 20. The rotor 20 is coupled via bolt 22 with the wheel assembly 12. The caliper 14 defines a cylinder 24 for movably receiving a piston 26 such that fluid pressure communicated to the cylinder 24 moves the piston 26 and friction element 16 into engagement with surface 28 of the rotor 20 and the caliper 14 and friction element 18 move into engagement with the surface 30 of the rotor 20.

In accordance with the invention, the rotor 20 comprises a pair of members 40 and 42 which are stamped or fabricated from steel and a connecting portion 44 similarly stamped or fabricated from steel. Each member 40 and 42 is further stamped or deformed to define a plurality of inwardly extending projections 46 and a plurality of outwardly facing depressions 48. The depressions 48 are formed on the surfaces 28 and 30. The connecting portion 44 is formed with a plurality of recesses 50 at the radial outer edge 52 and these recesses align with the radial inner projections 46. Consequently, when the pair of members 40 and 42 are engaged with each other to abut the projections 46 together, the projections disposed at an inner radial location will fit into the recesses 50. Furthermore, when the rotor 20 is constructed each member 40 and 42 must be connected together with the connecting portion 44 disposed between the members. Thereafter, the projections are welded, or suitably joined together and the connecting portion 44 is welded to member 40 or member 42, or to both members provided an opening 54 is provided at the radially inner edge 56 to permit air flow through the clearance 58 defined between the members when the projections are suitably joined together.

As shown in FIGS. 2–4, the projections 46, 146 and 246 can be arranged in many different patterns and the shape of each pattern can be altered. However, each projection shown provides a clearance such as shown at 58 in FIG. 1 when the associated members of projections 46, 146 and 246 are joined together via the projections. Similarly, the members with the projections 46, 146 and 246 are provided with depressions similarly patterned to the projections.

Turning to the alternative embodiment of FIG. 5, the rotor 344 includes a radially extending portion 310 disposed between members 316 and 318. The members 316 and 318 are adapted to engage with a pair of respective friction elements in a well known manner. Each member forms a ring with parallel opposite surfaces 320 and 322 for member 316 and 324 and 326 for member 318. The portion 310 of rotor 344 is stamped or suitably fabricated to define a plurality of projections 346 extending in both axial directions to engage the surfaces 322 and 326. When the portion 310 is stamped or suitably fabricated to form the projections, a plurality of depressions 348 is formed on both sides of the portion 310. The projections 346 are joined by welding or other means to the members 316 and 318 so that clearances 358 are formed on both sides of the portion 310. The clearances enable air to flow through the rotor, thereby cooling the rotor during braking.

Although the specification herein above refers to several embodiments, it is feasible by one skilled in the art to provide further modifications and/or alterations.

As such, these further modifications and/or alterations are included within the scope of the appended claims.

We claim:

1. A rotor for a disc brake assembly having a pair of friction elements engageable with the rotor to retard rotation thereof, the rotor comprising at least a pair of stamped members with radially extending surfaces engageable with a pair of friction elements, the pair of stamped members cooperating to define a clearance therebetween permitting air flow through the rotor to readily convey thermal energy to an environment for the disc brake during braking, characterized in that each of said pair of stamped members includes a plurality of integrally formed projections extending axially toward opposing integrally formed projections of the other stamped member, the integral projections of a respective stamped member aligned with a plurality of depressions in a surface engageable with an associated friction element, said projections for securing together the pair of stamped members and cooperating to define said clearance and reduce axial deflection of said pair of stamped members into said clearance during braking over the radial dimension for said pair of stamped members.

2. The rotor in accordance with claim 1, further comprising a connecting portion extending between said pair of stamped members and a wheel assembly associated with said disc brake assembly, said connecting portion defining abutment means cooperating with selected integral projections to prevent rotation between said pair of stamped members and said connecting portion.

3. The rotor in accordance with claim 2, in which said abutment means comprises a plurality of recesses for receiving radially inner projections.

4. A rotor for a disc brake assembly which includes a pair of friction elements that cooperate with a wheel assembly to retard rotation of the latter during braking, the rotor including a pair of stamped members with surfaces each designed for engagement with a respective friction element, each member having a plurality of integral projections extending axially toward projections of the other member and for securing the members together, the projections of each member being aligned with associated depressions in the surface engageable with an associated friction element, and a connecting portion extending between the pair of stamped members and the wheel assembly, said connecting portion being disposed between said pair of stamped members and cooperating with the stamped members to define a clearance therebetween permitting air flow through the rotor.

5. The rotor in accordance with claim 4, further comprising openings disposed in said connecting portion and receiving selected projections in order to prevent movement of said stamped members relative to said connecting portion.

6. A rotor for a disc brake assembly which includes a pair of friction elements that cooperate with a wheel assembly to retard rotation of the latter during braking, the rotor includng a pair of members with surfaces each designed for engagement with a respective friction element, and a connecting portion extending between the pair of stamped members and the wheel assembly, said connecting portion having a plurality of integral projections extending from respective sides of said connecting portion and engaging an associated member, said projections being secured to and supporting said associated member and each projection aligned with an associated depression in an opposite surface of said connecting portion, the connecting portion cooperating with each of said pair of members to define a clearance therewith permitting air flow through the rotor.

* * * * *